United States Patent
Miyake et al.

(10) Patent No.: US 6,632,973 B1
(45) Date of Patent: Oct. 14, 2003

(54) METHOD FOR DECOMPOSING OR OXIDIZING DIOXINS AND/OR POLY CHLORINATED BIPHENYLS CONTAINED IN LIQUID

(75) Inventors: Junichi Miyake, Akashi (JP); Tohru Ishii, Hyogo-ken (JP); Kiichiro Mitsui, Akashi (JP)

(73) Assignee: Nippon Shokubai Co., Ltd., Osaka-Fu (JP)

( * ) Notice: Subject to any disclaimer, the term of this patent is extended or adjusted under 35 U.S.C. 154(b) by 63 days.

(21) Appl. No.: 09/635,975

(22) Filed: Aug. 9, 2000

(30) Foreign Application Priority Data

| Aug. 9, 1999 | (JP) | 11-224830 |
| Jan. 20, 2000 | (JP) | 2000-011701 |
| Feb. 17, 2000 | (JP) | 2000-038939 |

(51) Int. Cl.[7] .................................................. A62D 3/00
(52) U.S. Cl. ...................... 588/205; 210/762; 210/763; 210/908; 210/909; 405/128.5; 588/206; 588/207
(58) Field of Search ................................ 588/205, 206, 588/207; 210/763, 762, 761, 760, 759, 758, 757, 908, 909; 405/128.5

(56) References Cited

U.S. PATENT DOCUMENTS

| 4,212,735 A | | 7/1980 | Miller |
| 4,276,198 A | | 6/1981 | Miller |
| 4,340,471 A | | 7/1982 | Jordan |
| 4,543,190 A | * | 9/1985 | Modell .................. 210/721 |
| 4,692,252 A | | 9/1987 | Atwood et al. |
| 4,751,005 A | | 6/1988 | Mitsui et al. |
| 5,160,636 A | | 11/1992 | Gilles et al. |
| 5,460,792 A | * | 10/1995 | Rosenbaum ............ 423/245.3 |
| 5,492,624 A | * | 2/1996 | Rozich .................. 210/605 |
| 5,501,799 A | | 3/1996 | Bond et al. |
| 5,746,926 A | * | 5/1998 | Ross et al. .................. 210/761 |
| 5,779,912 A | * | 7/1998 | Gonzalez-Martin et al. 210/748 |
| 5,855,797 A | | 1/1999 | Luong et al. |
| 6,056,883 A | * | 5/2000 | Bond et al. .................. 210/721 |
| 6,423,236 B1 | * | 7/2002 | Shiota et al. ............... 210/671 |

FOREIGN PATENT DOCUMENTS

| EP | 0 284 754 | 10/1988 |
| EP | 0 514 177 | 11/1992 |
| EP | 0 525 974 | 2/1993 |
| EP | 0 686 427 | 12/1995 |
| EP | 0 830 888 | 3/1998 |
| EP | 1 018 489 | 7/2000 |

OTHER PUBLICATIONS

Patent Abstracts of Japan, vol. 1999, No. 14, Dec. 22, 1999, and JP 11 253970 A (Mitsubishi Heavy Industries, Ltd.), Sep. 21, 1999—Abstract.
Patent Abstracts of Japan, vol. 015, No. 429, Oct. 31, 1991, and JP 03 178389 A (Japan Atom Energy Res. Inst.; others: 02), Aug. 2, 1991—Abstract.

* cited by examiner

Primary Examiner—Wayne A. Langel
(74) Attorney, Agent, or Firm—Wenderoth, Lind & Ponack, L.L.P.

(57) ABSTRACT

An object of the present invention is to provide a simple method which can efficiently convert dioxins and/or PCBs contained in liquid into unharmful substances. Such a method according to the present invention is by introducing a liquid containing dioxins and/or PCBs, and oxygen containing gas to a reactor in which catalystexists, and conducting wet-oxidation reaction under liquid phase condition of the introduced liquid. According to the present inventive method, a simple method which can efficiently extract dioxins, PCBs and/or component containing thereof, from soil may be provide by a method comprising of; contacting soil and/or ash containing dioxins and/or PCBs with a liquid. Further, the present invention provides a method for cleaning the unit used for decomposing or oxidizing dioxins and/or PCBs contained in liquid by introducing cleaning solution to the unit and conducting cleaning operation under liquid phase condition.

6 Claims, 2 Drawing Sheets

METHOD FOR DECOMPOSING OR OXIDIZING DIOXINS AND/OR POLY CHLORINATED BIPHENYLS CONTAINED IN LIQUID

BACKGROUND OF THE INVENTION

1. Field of the Invention

The present invention relates to a method for decomposing or oxidizing dioxins and/or PCBs into unharmful substances. To be more specific, it relates to a method for effectively decomposing or oxidizing dioxins and/or co-planer PCBs(poly chlorinated biphenyls) contained in liquid.

2. Description of the Prior Art

Dioxins including co-planer PCBs are chemically stable and accumulate in nature year by year.

Even though many methods for decomposing dioxins contained in soil and in incinerated gas have been suggested, many difficulties have been remained for decomposing dioxins contained in liquid, since dioxins are presented in pico gram per litter (pg/liter) concentration in liquid.

SUMMARY OF THE INVENTION

An object of the present invention is to provide a simple method which can efficiently convert dioxins and/or PCBs contained in liquid into unharmful substances.

Another object of the present invention is to provide a simple method which can efficiently extract dioxins, PCBs and/or component containing thereof, from soil.

Further, another object of the present invention is to provide a method for cleaning the unit used for decomposing or oxidizing dioxins and/or PCBs contained in liquid.

First object of the present invention can be solved by a method comprising of; introducing a liquid containing dioxins and/or PCBs, and oxygen containing gas to a reactor in which a catalyst is charged, and conducting wet-oxidation reaction under liquid phase condition of the introduced liquid.

Second object of the present invention can be solved by a method comprising of; contacting soil and/or ash containing dioxins and/or PCBs with a liquid for extraction.

Third object of the present invention can be solved by a method comprising of; by introducing cleaning solution to the unit used for decomposing or oxidizing dioxins and/or PCBs and conducting cleaning operation under liquid phase condition.

Other objects, features and advantages of the present invention will become apparent from 'the detailed description of the preferred embodiments of the invention ' to follow.

DETAILED DESCRIPTION OF THE PREFERRED EMBODIMENTS OF THE INVENTION

As a result of various studies, the present inventors have found a method for decomposing or oxidizing (hereinafter maybe referred to as "decomposing") dioxins and/or PCBs (hereinafter-maybe referred to as "dioxins") contained in liquid with efficiency. The method for decomposing dioxins contained in liquid is to treat the liquid with wet-oxidation process.

Any liquid containing dioxins such as poly chlorinated dibenzo-p-dioxins, poly chlorinated dibenzo furans, co-planer PCBs(poly chlorinated biphenyls), and other halogenated dioxins may be treated in accordance with the present invention.

Such a liquid containing dioxins may be, for example, waste water from waste incinerator, seepage water from landfill, or waste water discharged from various industrial plants such as chemical plants, and metal processing plants. Especially, waste water containing dioxins discharged from waste incinerator is preferably used.

In addition to the liquid containing dioxins, the present invention can be applicable to soil containing dioxins.

Examples of such a soil, which is not limited to, may be soil containing seepage water from incinerator, seepage water from site using incinerator, soil containing seepage water from landfill, soil containing flyash and/or burned ash of incinerator, and ash and/or flyash from incinerator.

According to the present invention, it is preferable to extract the dioxins from the soil before decomposing dioxins contained in the soil.

According to the present inventive method, a simple method which can efficiently extract dioxins, PCBs and/or component containing thereof, from soil may be provide by a method comprising of; contacting soil and/or ash containing dioxins and/or PCBs with a liquid.

Figure 1:
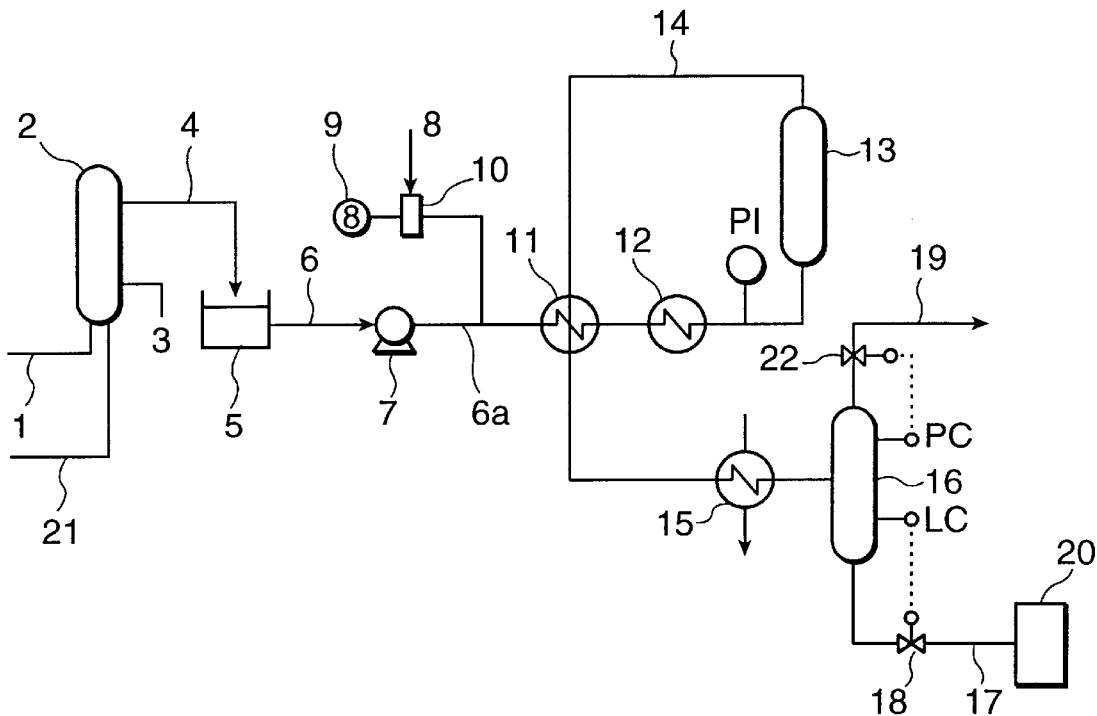
FIG. 1 is a schematic diagram of the system for use in the method of this invention.

The preferable method of extracting dioxins from the soil may be illustrated in FIG. 1, which is schematic diagram of an embodiment of a soil separation process for use in the invention. It should be noted that the apparatus of FIG. 1 is just an example of an apparatus usable in the method of the present invention, and the present invention does not necessarily use this apparatus.

The soil containing dioxins is supplied to a float separation unit 2 through a conduit 1. The float separation unit 2 for use in the invention is the unit in which influent soil contacts with liquid for extraction. By contacting the soil and the liquid for extraction, the soil excluding dioxins may settled down and dioxins may be suspended in the liquid for extraction.

Since dioxins are generally contained in combustion residue such as ash and fly ash, it is preferable to separate the combustion residue from the soil. According to the present invention, dioxins and dioxin containing content may be separated from the soil in the separation unit 2 wherein the soil maybe settled at the bottom of the separation unit 2 and dioxins and dioxin containing content may be float or suspended in the liquid for extraction. The mechanism of soil-dioxins separation in the separation unit 2 may be based on the fact that the specific gravity of the soil is larger than that of the liquid for extraction and that of the ash content.

The state of dioxins in the liquid for extraction is not specifically limited but dioxins may present in the state of fine particle suspended in the liquid for extraction, or may present adhere to fine particle matter suspended in the liquid for extraction. Most preferable state of dioxins is that dioxins are dissolved in the liquid for extraction.

At the separation unit 2, bubbles are preferably used to facilitate the separation performance, especially bubbles may have advantage to lift the suspended matter to the surface of the liquid for extraction. The method for generating the bubble in the liquid for extraction is not specifically limited, for example, the bubble may be generated by dissolving the pressurized air (from 0.1 to 0.5 Mpa (Gauge)) into the liquid for extraction and then release the air dissolved liquid for extraction under atmospheric pressure. Instead of air, gas which is hard to be decomposed in water such as nitrogen, oxygen and ozone may be used. Also compressed air by the compressor (not shown) may be used as a source of the bubble. Further more, aeration at the bottom of the separation unit 2 may be used as a source of the bubble. Still Further, the bubble may be generated by adding hydrogen peroxide to the liquid for extraction. The method of generating bubbles is not specifically limited to, for example, bubbles may be generated by accelerating the decomposition of hydrogen peroxide by aeration, by catalyst, and by chemical agent. Any of these methods can be used alone or in combination of two or more of these methods.

Water is preferably used as the liquid for extraction used in the separation unit 2. Since dioxins have hydrophobic property, it is preferable to add solvent which can promote solubility of dioxins to water before contacting with soil. Such a solvent is not specifically limited but alcohol such as methanol is exemplified.

The temperature of the liquid for extraction in the separation unit 2 is not specifically limited, but separation performance of the separation unit 2 may be increased with the rise of liquid for extraction temperature. The preferable temperature of the liquid for extraction is 5° C. or more, more preferably 20° C. or more, and most preferably 50° C. or more. The upper limit of the liquid for extraction temperature is not specifically limited but the preferable temperature of the liquid for extraction is 95° C. or less. When the temperature of the liquid for extraction is above 95° C., the liquid for extraction may be vaporized and large unit may need to keep its liquid phase.

The method of adjusting the temperature of the liquid for extraction ,which is not limited, may be that the liquid for extraction may be heated by heat exchanger (not shown) and/or heater (not shown) before the liquid for extraction is introduced to the separation unit 2, and/or may be heated by the heater(not shown) equipped in the separation unit 2.

The method of supplying the liquid for extraction is not specifically limited and the liquid for extraction may be supplied to the separation unit 2 via a conduit 21 or may be supplied to the separation unit 2 with the oxygen containing gas. The liquid for extraction may be supplied to the separation unit 2 at any position of the separation unit 2, and the liquid for extraction may be supplied to the separation unit 2 from the lower portion or the upper portion of the separation unit 2.

The soil may be supplied to the separation unit 2 continuously or non-continuously.

The soil may be supplied to the unit 2 with stirred, to facilitate the separation of dioxins and dioxin containing content from the soil. The method of stirring the soil is not limited.

According to the present invention, it is preferable to introduce the liquid for extraction to the separation unit 2 first, and then introducing the soil to the separation unit 2 to improve contacting efficiency.

The soil processed in the separation unit 2 is extracted from a conduit 3 and thus obtained liquid for extraction containing dioxins is extracted from a conduit 4, which may be connected to a tank 5, or may be connected with a conduit 6 for wet-oxidation.

According to the present invention, dioxins and/or PCBs contained in liquid into unharmful substances efficiently by introducing a liquid containing dioxins and/or PCBs, and oxygen containing gas to a reactor in which catalyst is charged, and conducting wet-oxidation reaction under liquid phase condition of the introduced liquid.

Figure 2:
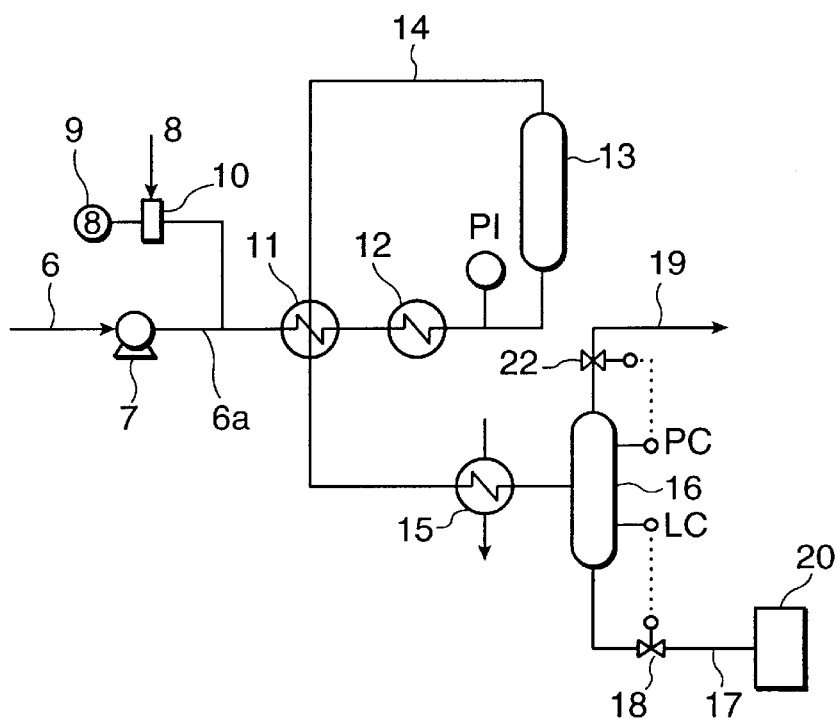
FIG. 2 is a schematic diagram of the system for use in the method of this invention.
Figure 3:
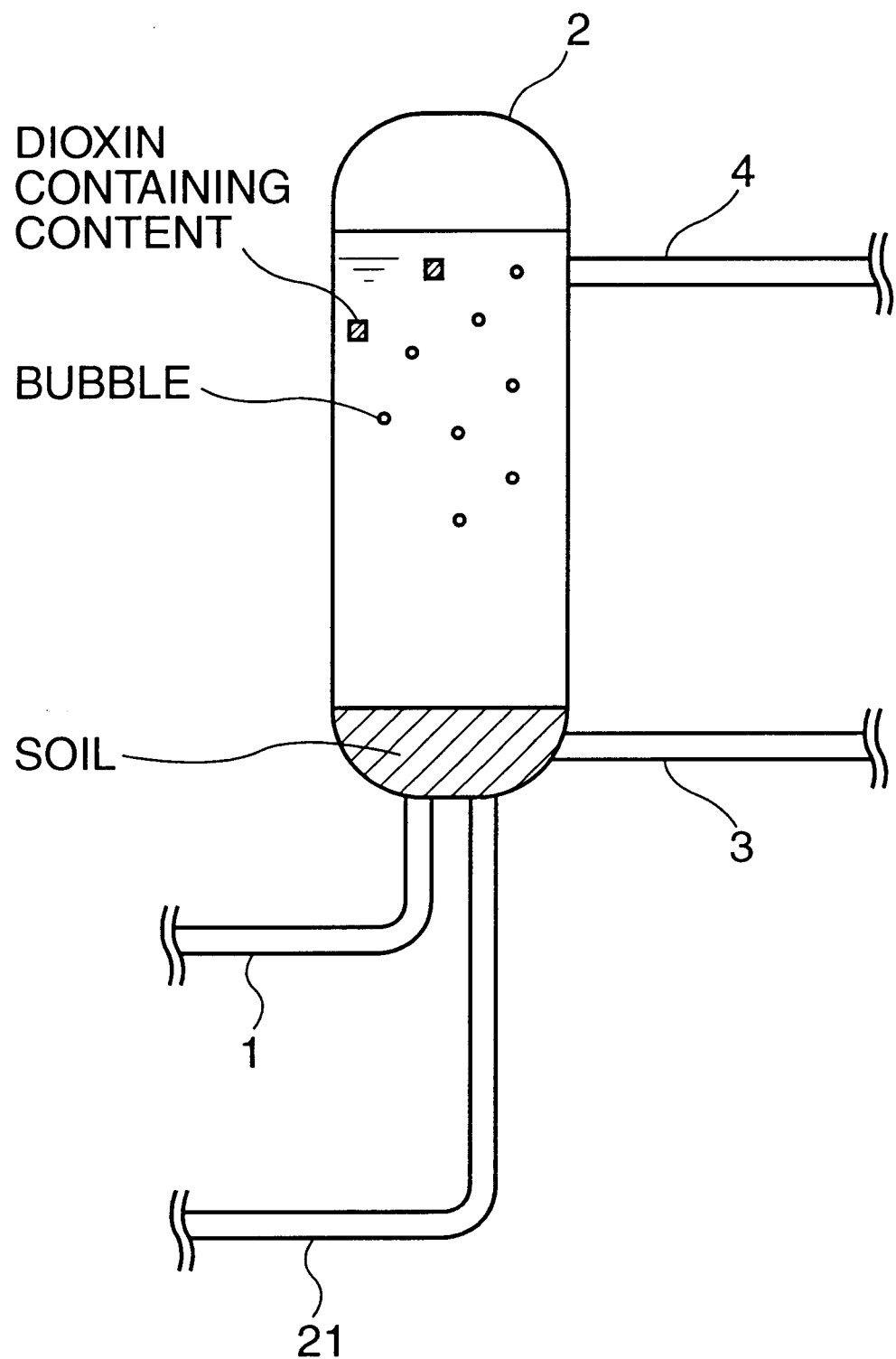
FIG. 3 is a schematic diagram of the separation unit for use in the method of this invention.

The present invention will be further illustrated with reference to FIG. 2, which is schematic diagram of an embodiment of a wet-oxidation process for use in the invention. It should be noted that the units of FIG. 2 are just an example of the unit usable in the method of the present invention, and the present invention does not necessarily use these unit.

Liquid containing dioxins is supplied through a conduit 6 to a wet oxidation reactor 13. The influent liquid may be pressurized by pump 7. The pump 7 can be equipped at any position of the conduit 6.

The space velocity at this time is not specifically limited, and is properly determined in accordance with the processing capacity of the reactor 13 and the temperature of the liquid. The space velocity (LHSV) at the reactor 13 is preferably in the range from $0.1\ hr^{-1}$ to $20\ hr^{-1}$, and more preferably from $0.5\ hr^{-1}$ to $10\ hr^{31\ 1}$, and the most preferably from $1\ hr^{-1}$ to $5\ hr^{-1}$. If the space velocity is lower than $0.1\ hr^{-1}$, large equipment may be needed. Contrary to this, if the space velocity is higher than $20\ hr^{-1}$, the decomposition of dioxins may not be sufficiently conducted in the reactor 13.

According to the present invention, it is preferable to add cation to the liquid which is to be treated in the reactor 13. The kind of cation may be counter-ion which can form salts with halogen ion generated in the reactor 13. The preferable cation to be added may be alkali metal ions such as sodium and potassium.

The amount of the cation to be added to the liquid is not specifically limited but the preferable amount of the cation may be equivalent or more of the amount of halogen to form salts.

When the liquid is in acidic condition in the reactor 13, the durability of the surface of the inside wall of the reactor 13 may be lowered. By adding the cation to the liquid, in addition to avoid lowering the durability of the reactor 13, the reaction rate of decomposing dioxins is accelerated, and higher processing capacity may be obtained.

According to the present invention, the kind of alkali metal ion is not specifically limited as long as it is soluble and can form salts with the halogen ion. Examples of alkali metal ions are, which is not limited to, sodium hydroxide, potassium hydroxide, sodium carbonate, sodium acetate. When adding salts containing organic acid such as sodium acetate to the liquid, acetic acid ion may be decomposed into water and carbon dioxide.

The method of adding cation is not specifically limited and may be supplied to the tank 5 and/or supplied to the liquid via a conduit (not shown).

In the reactor 13, the liquid is treated in the presence of oxygen-containing gas. By increasing oxygen concentration in the liquid, dioxins contained in the liquid can be decomposed or oxidized with high efficiency by wet oxidation.

The oxygen-containing gas to be used in the present invention can be any gas as far as it contains oxygen molecules. As examples of such a gas include, but not limited to, pure oxygen, oxygen enriched gas, ozone, hydrogen peroxide, air and exhaust gas containing oxygen from other plants. Among them, air is cheap and is recommended. Oxygen and ozone may be used by diluting with inert gas and the amount of the inert gas is determined in accordance with the concentration of nitrogen in the liquid and/or COD (chemical oxygen demand) of the liquid.

The supply amount of the oxygen-containing gas is not specifically limited, and the oxygen-containing gas may be supplied in an amount effective in increasing the efficiency of decomposing dioxins in the liquid.

The amount of oxygen in the oxygen-containing gas preferably fall in the range from 0.5 to 100 times, and more preferably from 1 to 50 times with respect to an amount necessary to decompose COD contents in the liquid. If the amount of the oxygen is less than 0.5 times, dioxins in the liquid may not be sufficiently decomposed, and dioxins may be remained undecomposed in wet-oxidized liquid. Contrary to this, if the amount of the oxygen is larger than 100 times, large equipment may be needed.

The supply amount of oxygen contained in the oxygen containing gas may be adjusted by measuring the amount of oxygen contained in the oxygen containing gas and controlling the supply amount of the oxygen-containing gas.

The oxygen containing gas, such as air may be introduced via a conduit 8 and admixed with the influent liquid in a conduit 6a or may be introduced to the reactor 13 without admixing with the influent liquid. It is preferable to introduce the oxygen containing gas to the influent liquid before the influent liquid is supplied to heating means such as a heat-exchanger 11 and/or a heater 12. The oxygen containing gas may be pressurized by a compressor 9 before supplying to the influent liquid.

The conduit 8, by which oxygen containing gas is supplied to the influent liquid, can be preferably connected to the conduit 6 at any position between the pump 7 and an inlet of the reactor 13, and more preferably between the pump 7 and the heat exchanger 11 such as shown in FIG. 2.

The oxygen containing gas added liquid (hereinafter may be called as "fluid") flows through a conduit 6a to heating device such as heat exchanger 11 and is preheated in the heat exchanger 11 to temperature which initiates the wet oxidation reaction.

The fluid may be heated by heat exchanger 11 and/or heater 12 before introducing to reactor and/or the fluid may be heated by heater (not shown) equipped at the reactor.

The heater 12 may be optionally equipped to keep and/or to elevate the temperature of the fluid.

At the heat exchanger 11, the fluid may be heated by the fluid discharged from the reactor 13 via a conduit 14 or liquid from other plant.

According to the present invention, the fluid is preferably preheated before introducing to the reactor 13 to minimize reaction initiation time.

The heater 12 is also optionally used to elevate the temperature of the fluid before introducing to the reactor 13.

The resulting fluid is supplied to the reactor 13. The position of supplying the fluid to the reactor 13 may be from at any position of the reactor 13, and for example, the fluid may be supplied to the reactor 13 at the bottom of the reactor 13, or upper portion of the reactor 13. It is preferable to introduce the fluid into the reactor 13 from its bottom side.

When the liquid is introduced into the reactor 13 without admixing the oxygen containing gas, the liquid may be introduced to the reactor 13 from its bottom side and the oxygen containing gas may be introduced to the reactor 13 from its upper side to conduct the wet-oxidation by counter flow condition in the reactor 13.

Depending on the other conditions, the temperature of the fluid in the reactor 13 is preferably at 370° C. or lower, and more preferably 300° C. or lower, and the most preferably 250° C. or lower. If the temperature of the fluid is higher than 370° C., the fluid may not be kept in its liquid phase.

On the contrary, the temperature of the fluid in the reactor 13 is preferably 20° C. or higher, and more preferably 50° C. or higher. If the temperature of the fluid is lower than 20° C., the efficiency of decomposing dioxins may be decreased.

The pressure in the reactor 13 is not specifically limited insofar as the fluid keeps its liquid phase.

In general, if the temperature of the fluid in the reactor 13 is 20° C. or higher, and lower than 100° C., it is preferable to apply suitable pressure to the fluid for improving the efficiency of the wet-oxidation, and may be conducted under atmospheric pressure. If it is 100° C. or higher, the fluid may turn into gas phase under atmospheric pressure and applying enough pressure to the fluid is needed to keep its liquid phase.

It should be noted that the temperature of the fluid in the reactor 13 can be adjusted and the reaction may be carried out at a pressure sufficient to prevent evaporation of the fluid, even though the higher the temperature in the reactor, the higher the processing rate of the reactor can be obtained.

In the method of the present invention, the number, kind, and shape of the reactor 13 are not specifically limited, and one or more reactors which have been conventionally used in wet-oxidation may be employed. For example, a reactor may be in the form of single-tube or multiple-tube. When a plurality of reactors are used, they are arranged at any positions, for example, lengthwise or in parallel with each other in accordance with the necessity.

According to the present invention, catalyst is charged in the reactor 13.

Preferably, solid catalyst is charged in the reactor 13. When the solid catalyst is used, dioxins in the fluid are decomposed with higher efficiency than the case of using no catalyst. The kind of solid catalyst is not specifically limited as long as the catalyst have enough durability and activity under liquid phase condition, and recommended is solid catalyst containing at least one metal element and/or its compound selected from the group consisting of titanium, silicon, aluminum, zirconium, manganese, iron, cobalt, nickel, cerium, tungsten, copper, silver, gold, platinum, palladium, rhodium, ruthenium, and iridium. And solid catalyst containing activated carbon is also recommended, such the activated carbon may be activated charcoal or activated carbon fiber. Most recommended catalyst is the catalyst containing 'A' component(s) and 'B' component(s).

The 'A' component is activated carbon and/or oxide of at least one selected from the group consisting of iron, titanium, silicon, aluminum and zirconium.

Examples of the 'A' component are, but not limited to, metal oxide such as titanium oxide, iron oxide, zirconium oxide; composite oxide such as titanium oxide-zirconium oxide, titanium oxide-iron oxide; activated carbon; composition of activated carbon and metal oxide. The minimum amount of the 'A' component contained in the solid catalyst is not specifically limited but the durability of the solid catalyst is improved when containing 30% (mass %) or more of the 'A' component with respect to the total mass of the solid catalyst. The maximum amount of the 'A' component in the solid catalyst is not specifically limited and preferably 99.95%(mass %) or less with respect to the total mass of the solid catalyst.

The 'B' component is metal and/or compound of at least one selected from the group consisting of manganese, cobalt, nickel, cerium, tungsten, copper, silver, gold, platinum, palladium, rhodium, ruthenium, and iridium.

Examples of the 'B' component are, but not limited to, metal, oxide or composite oxide of the element mentioned above. The minimum amount of the 'B' component contained in the solid catalyst is not specifically limited but the decomposition ability of the solid catalyst may be improved when containing 0.05% (mass %) or more of the 'B' component with respect to the total mass of the solid catalyst. The maximum amount of the 'B' component in the solid catalyst is not specifically limited but preferably 70% (mass %) or less with respect to the total mass of the solid catalyst.

Especially when using silver, gold, platinum, palladium, rhodium, ruthenium, and iridium (herein after may be called as a 'B–1 component')as the 'B' component, the preferable maximum amount of metal and/or oxide of B–1 component may be 10% (mass %) or less with respect to the total mass of the solid catalyst. More than 10% of metal and/or oxide of B–1 component may be usable but the ability of the solid catalyst may be saturated and also running cost may be increased due to the use of these high priced metals.

When using manganese, cobalt, nickel, cerium, tungsten, and copper (herein after may be called as a 'B–2 component') as the 'B' component, the preferable maximum amount of metal and/or oxide of B–2 component may be 70% or less with respect to the total mass of the solid catalyst.

It should be noted that any combination of the B–1 and the B–2 component are selected within the range from 0.05% to 70% (mass %) with respect to the total mass of the solid catalyst.

As the 'B' component, one selected from B–1 component is preferably contained in the solid catalyst. The solid catalyst containing B–1 component shows high catalyst activity which may lead to the high decomposition ratio of dioxins. Among B–1 component, metal or compound of at least one element selected from the group consisting of platinum, palladium, rhodium, ruthenium, and iridium shows especially high catalyst activity. Among B–2 component, metal or oxide of manganese, cobalt, nickel and copper shows higher catalyst activity.

The shape of solid catalyst is not specifically limited, and may be taken any shape. For example, solid catalyst may be in the shape of pellet, sphere, grain, ring, or monolithic shape such as honeycomb.

When treating suspended dioxin substances contained in the fluid, honeycomb shaped solid catalyst is preferably used to avoid clogging of catalyst bed by solid matter and deposit contained in the fluid.

As long as catalyst shows activity under liquid phase condition, homogeneous catalyst used in conventional wet-oxidation for waste water may be used in the present invention. The specific examples of the catalyst are, but not limited to, at least one element selected from the group consisting of titanium, silicon, aluminum, zirconium, manganese, iron, cobalt, nickel, cerium, tungsten, copper, silver, gold, platinum, palladium, rhodium, ruthenium, and iridium.

In the reactor 13, filler made of metal or ceramic can be charged to improve the agitation of the fluid and the oxygen containing gas. The filler may be made of oxide containing metal such as titan, titan-palladium, and zirconium, or ceramic such as titan, iron, aluminum, silica, zirconium. The shape of the filler is not specifically limited and can be use any shaped filler.

According to the present invention, "decomposing or oxidizing dioxins" means decomposition such as oxidation and dechlorination of dioxins. In the reactor 13, dioxins are decomposed into unharmful substances.

After dioxins are decomposed in the reactor 13, the resultant wet-oxidized fluid (herein after may be called as effluent fluid ) is discharged through a conduit 14. The effluent fluid may be introduced to the heat exchanger 11 to cool down the temperature of the effluent fluid. In the heat exchanger 11, the heat of the effluent fluid may be exchanged with the heat of the influent fluid which is to be introduced to the reactor 13.

Further more the effluent fluid from the heat exchanger 11 may be introduced to the cooler 15 to cool down the temperature of the effluent fluid.

It should be noted that the heat exchanger 11 and cooler 15 can be used in combination or used alone. When using the heat exchanger 11 and cooler 15, the effluent fluid may be introduced to the heat exchanger 11 first for exchange the heat of the effluent fluid with the influent fluid to be introduced to the reactor 13, and then introduce to the cooler 15.

Then, the effluent fluid is supplied to a gas-liquid separator 16 where gas contained in the effluent fluid is separated. In the gas-liquid separator 16, the surface level of the gas separated liquid is detected by a liquid level controller LC, and is controlled to be constant by a surface level control valve 18. The "constant" herein means that the liquid level is controlled to maintain constant value or the liquid level is adjusted within predetermined liquid level range.

Alternatively, the effluent fluid may be cooled or not be cooled to a proper temperature by the heat exchanger 11 and/or the cooler 15 before introducing to the gas-liquid separator 16, and is introduced to the gas-liquid separator 16 through a pressure control valve(not shown).

The treated liquid, from which the gas is released, is discharged via a conduit 17. The discharged treated liquid may be sent to a tank 20. The discharged treated liquid may be further treated by any conventionally known process.

The pressure inside the gas-liquid separator 16 may be controlled by pressure controller PC, is controlled to be constant by a pressure control valve 22. The gas separated from the effluent fluid in the gas-liquid separator 16 is discharged via a conduit 19 and is vented to the atmosphere or further treated.

Another object of the invention is to provide a method of cleaning a unit used for decomposing dioxins and/or PCBs contained in liquid, and more specifically a method for removing generated solid materials, i.e., scale build-up, from the unit used in the wet oxidation process such as heat exchanger, heater, wet oxidation reactor, cooler, gas-liquid separator (hereinafter may be called as "cleaning operation"). More specifically, the method of the invention is preferably applicable to remove the solid materials such as precipitate and/or scale from the unit, and preferably from inside wall of heat exchanger, of heater, of the reactor, and more preferably from surface of solid catalyst.

According to the present invention, a method for cleaning the unit used for decomposing or oxidizing dioxins and/or PCBs contained in liquid is by introducing cleaning solution to the unit and conducting cleaning operation under liquid phase condition.

By removing the solid material from the unit, degradation of thermal efficiency, catalytic activity, and catalyst longevity is avoided.

Also by removing the solid material from the unit periodically, stable operation of the present inventive method for decomposing dioxins mentioned above can be secured and high treatment efficiency can be maintained.

According to the present invention, the solid material, which is to be removed, may be generated from materials contained in the liquid.

The solid materials i.e., precipitate or scale formed in the unit may contains scale forming material such as, but not limited to, heavy metals, aluminum, phosphate, silicone, calcium and/or magnesium.

The heavy metals herein may be at least one selected from the group consisting of iron, chrome, copper, nickel, cobalt, manganese, cadmium, zinc, tin, antimony, lead, thallium, mercury, arsenic, and bismuth.

The form of the scale forming material is not specifically limited to, but may be in the form of ion or organic metal compound of mentioned above.

According to the present invention, the solid material such as scale or precipitate may be comprised of refractory oxide, insoluble oxide, refractory salt, and/or insoluble salt of the scale forming material.

The scale forming materials are usually contained in the liquid.

The unit according to the present invention, any unit used for decomposing dioxins contained in the liquid is applicable. Also, the unit such as heat exchanger, heater, cooler are applicable to the present method, the unit may be used in normal temperature, in high temperature, in high pressure, and in atmospheric pressure.

The cleaning operation of the reactor to which the filler is charged can be conducted and especially when the filler made of oxide such as titanium oxide, titanium-zirconia, titanium-iron oxide is charged in the reactor, better cleaning operation effect may be obtained.

Also the cleaning operation of the reactor to which adsorbent is charged can be conducted. The adsorbent may be made from ceramic, and to be more specific, the adsorbent may include such as titanium, iron oxide, alumium oxide, silicon dioxide, or zirconium oxide. Among them, titanium oxide, titanium-zirconia, titanium-iron oxide is preferably used which may improve the cleaning operation effect. The shape of the adsorbent is not specifically limited and can be taken any shape.

Material of the reactor for use in the present invention is not specifically limited to, but examples are titanium, titanium-palladium, zirconium, SUS, Hastelloy®, vinyl chloride, polyethylene, polypropylene, teflon® or coated metal plate such as with teflon. It should be noted that the materials made from vinyl chloride, polyethylene and polypropylene which are liable to lower the strength (i.e., durability) of the material itself under the high temperature, these materials should be cleaned under low temperature condition.

When using acid cleaning solution, SUS shows high performance in cleaning, but has some problem in corrosion resistance. It is recommendable to clean SUS-maid inside material of the reactor at low temperature, at low concentration of acid, at high concentration of iron or copper and in short period of time.

According to the present invention, cleaning solution, which has the ability to remove the solid matter, may be liquid containing alkali or acid (hereinafter may be called "alkali cleaning solution" or "acid cleaning solution" respectively).

Among alkali, sodium hydroxide and potassium hydroxide is preferably used in the present invention. The concentration of alkali in the alkali cleaning solution is not specifically limited, but the concentration is preferably 1 g/liter or more, and more preferably 10 g/liter or more of the alkali cleaning solution to obtain better cleaning operation result. When the concentration of alkali is less than 1 g/liter, the cleaning operation effect may decline drastically. When the concentration of alkali group is less than 10 g/liter of the alkali cleaning solution, the amount of alkali cleaning solution supplied may be increased. When large amount of the alkali cleaning solution is supplied, complicated aftertreatment process may be required for handling the used alkali cleaning solution, or high temperature may be required in order to closeout the cleaning operation in a short period of time.

The concentration of alkali is preferably less than 400 g/liter, and more preferably less than 300 g/liter in the alkali cleaning solution. When the concentration of alkali in the alkali cleaning solution is 400 g/liter or more, the viscosity of cleaning solution may be increased, which may arise difficulty of supplying the alkali cleaning solution through a conduit, i.e., clogging may be occurred in a conduit. Also, when the concentration of alkali in the alkali cleaning solution is 400 g/liter or more and conducting the cleaning operation under elevated temperature, corrosion resistance of the unit which is to be cleaned may be degraded.

It should be noted that the concentration of alkali contained in the cleaning solution can be modified during the cleaning process and can be adjustable within above mentioned concentration range.

Among alkali, sodium hydroxide or potassium hydroxide are preferably used, and sodium hydroxide is more preferably used in the present invention.

The present inventors have examined the cleaning performance of sodium hydroxide and potassium hydroxide separately under the same condition, and resulted in the same cleaning operation performance. By considering of this result, sodium hydroxide has advantage in cost efficiency.

Sodium carbonate, potassium carbonate, lithium hydroxide, cesium hydroxide or rubidium hydroxide can be used as alkali in stead of sodium hydroxide and potassium hydroxide, to minimize the deterioration of the corrosion resistance of the unit. Among them, sodium carbonate and potassium carbonate has advantage in cost efficiency and are recommended.

The alkali cleaning solution is preferably used to remove the solid matter such as precipitate or scale comprising at least one selected from the group of aluminum, phosphate, and silicon as a main component.

The alkali cleaning solution may have inadequate ability to remove the solid matter comprising iron as a main component. The alkali cleaning solution may form diiron trioxide, which is more stable form, with iron contained in solid matter. In such a case, it may be hard to remove the solid matter from the unit with the alkali cleaning solution.

The temperature of the alkali cleaning solution during the cleaning operation of the unit is not specifically limited but in general, the temperature of the alkali cleaning solution may be within the range from 50° C. to 300° C. More preferably from 130° C. to 270° C.

When the temperature is below 50° C., enough cleaning result may not be obtained. When the temperature is above 300° C., time needed for cleaning operation may be shortened and more preferable cleaning result may be obtained, as long as the cleaning operation is conducted under liquid phase condition of the alkali cleaning solution. When the temperature of the alkali cleaning solution is high, high pressure may need to be applied for the cleaning operation.

When the temperature of the alkali cleaning solution is high and the alkali cleaning solution is comprised of sodium hydroxide or potassium hydroxide, corrosion resistance of the unit may be decreased.

According to the present invention, acid for use in the acid cleaning solution may be any acid, preferably hydrogen chloride and sulfuric acid is used in the present invention. The concentration of acid in the acid cleaning solution is not specifically limited, but the concentration is preferably 3 g/liter or more, and more preferably 10 g/liter or more in the cleaning solution to obtain better cleaning operation result. When the concentration of acid is less than 3 g/liter in the acid cleaning solution, the cleaning operation effect may decline drastically. When the concentration of acid is less than 10 g/liter in the acid cleaning solution, the amount of the acid cleaning solution supplied may be increased. When large amount of the acid cleaning solution is supplied, complicated aftertreatment process may be required for handling the used acid cleaning solution, or high temperature, i.e. above 100° C., and high pressure may be required in order to keep its liquid phase condition and to closeout the cleaning operation in a short period of time.

The concentration of acid is preferably less than 700 g/liter, and more preferably less than 300 g/liter in the acid cleaning solution. When the concentration of acid in the acid cleaning solution is 700 g/liter or more, the viscosity of the acid cleaning solution may be increased, which may arise difficulty of supplying the acid cleaning solution through a conduit, i.e., clogging may be occurred in a conduit. Also, when the concentration of acid in the acid cleaning solution is 700 g/liter or more and conducting the cleaning operation under elevated temperature, corrosion resistance of the unit may be degraded.

It should be noted that the concentration of acid contained in the acid cleaning solution can be modified during the cleaning operation and can be adjustable within above mentioned concentration range.

Hydrogen chloride is more preferably used in the present invention.

Hydrogen chloride and sulfuric acid may be used in combination, and the ratio of hydrogen chloride and sulfuric acid in the acid cleaning solution is not specifically limited but can be taken any ratio unless the concentration of acid is within above mentioned concentration range.

The present inventors have examined the cleaning operation effect of hydrogen chloride containing cleaning solution and sulfuric acid containing cleaning solution separately under the same condition, and have resulted in that hydrogen chloride containing cleaning solution showed high cleaning effect against wide variety of solid matters.

The acid cleaning solution can preferably be used to remove solid matter such as precipitate or scale comprising at least one selected from the group consisting of aluminum, phosphate, silicon, calcium, and magnesium as a main component.

The temperature of the acid cleaning solution during the cleaning operation of the unit, is not specifically limited but in general, the temperature of the acid cleaning solution may be within the range from 10° C. to 200° C. More preferably from 50° C. to 100° C.

When the temperature is 100° C. or below, the cleaning operation can be conducted under atmospheric pressure. When the temperature is 50° C. or above, time needed for the cleaning operation may be shortened and more preferable cleaning operation effect may be obtained. When the temperature of the acid cleaning solution is above 200° C. and the acid cleaning solution contains hydrochloric acid or sulfuric acid, corrosion resistance of the material used in the unit, which is to be cleaned, may be decreased.

To minimize such a decrease in corrosion resistance of the unit, it is preferable to add heavy metal ion and/or heavy metal compound to the acid cleaning solution. In addition to adding heavy metal ion and/or heavy metal compound, it is also preferable to conduct the cleaning operation at temperature of below 160° C.

The heavy metal ion and/or heavy metal compound, which is to be added to the acid cleaning solution may be ion and/or compound of one selected the group consisting of iron, copper, chrome, manganese, nickel, cobalt and/or cerium. Among them, ions and/or compound of iron or copper are recommended. Also among heavy metal ion and heavy metal compounds, heavy metal ions may be used preferably over heavy metal compound. Among heavy metal ions, high oxide type ion is more preferably used. Specific example of the heavy metal ion and/or heavy metal compound is not specifically limited as long as the heavy metal ion and/or heavy metal compound is soluble to the acid cleaning solution in the state of ion. Such a ion may be triatomic iron or diatomic copper.

The concentration of the heavy metal ion and/or the heavy metal compound may be 50 mg/liter or more, and more preferably 100 mg/liter or more and preferably 100 g/liter or less, and more preferably 10 g/liter or less in the acid cleaning solution. When the concentration of the heavy metal ion and/or heavy metal compound is less than 50 g/liter in the acid cleaning solution, enough corrosion resistance may not be attained, and also when the concentration is more than 100 g/liter in the acid cleaning solution, the amount of the solid matter, which is contained in used acid cleaning solution, may be increased.

It should be noted that the concentration of the heavy metal ion and/or the heavy metal compound in the acid cleaning solution may be adjusted in accordance with various cleaning operational condition such as the temperature of the acid cleaning solution and the concentration of acid in the acid cleaning solution. When the cleaning operation is conducted at elevated temperature, or when the concentration of the acid in the acid cleaning solution is high, it is preferable to increase the concentration of the heavy metal ion and/or heavy metal compound in the acid cleaning solution. For example, if the temperature is at 90° C., and the concentration of hydrogen chloride in the acid cleaning solution may be 100 g/liter, iron ion and/or copper ion may preferably be added to the acid cleaning solution at an amount of ranging from 300 mg/liter to 1 g/liter to improve the result of the cleaning operation result by the acid cleaning solution.

The heavy metal ion and/or heavy metal compound can be supplied to the acid cleaning solution at any position and at any timing before initiating the cleaning operation.

The heavy metal ion and/or heavy metal compound added to the acid cleaning solution may be ion and/or compound of at least one selected form the group consisting of iron, copper, chrome, manganese, nickel, cobalt, and cerium.

Iron ion, which is to be supplied to the acid cleaning solution, may be iron salts such as ferric chloride, ferric sulfate, ferric nitrate and ferric acetate. Copper ion, which is to be supplied to the acid cleaning solution, may be copper salts such as cupric chloride, cupric sulfate, cupric nitrate, cupric acetate. Among them chloride, or sulphate is preferably supplied to the acid cleaning solution.

According to the present invention, the pressure of the unit during the cleaning operation is not specifically limited as long as the alkali or acid cleaning solution can keep its liquid phase. The pressure may be decided in accordance with the operating temperature of the alkali or acid cleaning solution.

According to the present invention, oxidizing agent may be used preferably with the alkali cleaning solution and with the acid cleaning solution. The oxidizing agent may be any gas as far as it contains oxygen molecules. As examples such a gas include, but not limited to, pure oxygen, oxygen enriched gas, ozone, air and exhaust gas containing oxygen from other plants. Among them, air is cheap and is recommended.

The supply amount of the oxidizing agent is not specifically limited, and the oxidizing agent may be supplied in an amount effective for forming oxide film on the surface of inside wall of the unit. If the amount of oxidizing agent added is not enough to form the oxide film, the corrosion resistance of the surface of the inside wall may be decreased.

The amount of oxygen in the oxidizing agent preferably fall in the range from 5% to 100%, and more preferably from 10% to 30% with respect to total gas amount.

The supply amount of the oxidizing agent gas may be adjusted, for example, by mounting an oxidizing agent gas flow rate control valve (not shown).

The method of adding the oxidizing agent is not specifically limited but it is preferable to add the oxidizing agent to the cleaning solution via the conduit 8 used for adding the oxygen containing gas to the liquid and also it is preferable to add the oxidizing agent to the cleaning solution before introducing it to the unit.

The time period of the cleaning operation is not specifically limited, but the preferable cleaning operation time may be 1 hour or more, and more preferably 2 hours or more to obtain enough result of the cleaning operation. The upper limit of the cleaning operation time is not specifically limited but the longer the cleaning operation time the shorter the decomposing operation time, which is the time needed for decomposing dioxins. The cleaning operation time may be preferably 48 hours or less, and more preferably 24 hours or less.

The cleaning operation may be continuous cleaning system, which means continuously supplying the cleaning solution to the unit, or may be batch type cleaning system, which means that the specific amount of cleaning solution is supplied to the unit and extract the cleaning solution after staying in the unit during the time period of the cleaning operation.

The method of supplying the cleaning solution is not specifically limited but it is preferable to supply the cleaning solution to the unit via a conduit 6 used for supplying the liquid and also from another conduit which may be equipped for supplying the cleaning solution.

The supply amount of the cleaning solution is not specifically limited and may be determined in accordance with the condition of the cleaning operation. In general, the supply amount of the cleaning solution may be equal amount of the volume of the unit to be cleaned, and more preferably 3 times or more of the volume of the unit. Also the supply amount of the cleaning solution may be 20 times or less, and more preferably 15 times or less of the volume of the unit.

The space velocity (LHSV) may be 0.01 $hr^{-1}$ or more, and more preferably 0.1 $hr^{-1}$ or more. And also the space velocity may be 100 $hr^{-1}$ or less and more preferably 10 $hr^{-1}$ or less. As one example of the operational condition of the continuous cleaning system, when the space velocity is set at 1 $hr^{-1}$, the cleaning operation time needed for cleaning the unit may be from 1 hour to 20 hour. As one example of the operational condition of the batch type cleaning system, it is recommended to repeat the cleaning operation 1 to 20 times and in each cleaning operation, the time of the cleaning solution staying in the unit may be 1 hour.

The cleaning solution in the unit may flow in the same direction with the liquid which is to be treated to decompose dioxins contained in the liquid or may flow in the reverse direction with the liquid. To obtain better cleaning effect, the stream direction of the cleaning solution may be the reverse direction. For example the cleaning solution may be flow form the outlet of the reactor 13 (i.e., from the conduit 14) to the inlet of the reactor 13 (i.e., to the conduit 6a).

As to the batch type cleaning system, the stream direction of the cleaning solution may be the same direction or the reverse direction with the liquid. To obtain better result of the cleaning operation, the cleaning solution may flow in the same stream direction with the liquid which is to be treated in the wet-oxidation process.

The spent cleaning solution used for cleaning operation may be disposed after properly treated. The pH of the spent cleaning solution may be adjusted before separating the solid matter from the cleaning solution, and after that then obtained separated solution and solid matter may be further treated with conventionally known process such as biological treatment, chemical treatment, or physical treatment.

The agent used for adjusting the pH of the spent acid cleaning solution is not specifically limited and the agent may be alkali, sodium hydroxide, or sodium carbonate.

The agent used for adjusting the pH of the spent alkali cleaning solution is not specifically limited and the agent may be acid, hydrochloric acid or sulfuric acid.

The method of separating the solid matter from the spent the cleaning solution is not specifically limited and in general, solid-liquid separator such as precipitator, centrifugal, strainer may be used.

To facilitate the separation, conventionally known coagulating agent, coagulant aid, or filter aid may be used.

This application is based on Patent Application Nos. H11-224830, 2000-11701 and 2000-38939 filed on Japan, the content of which are hereby incorporated by references.

The invention will be further illustrated in detail with reference to several inventive examples and comparative examples below which are not intended to limit the scope of the invention. Example 1

The decomposition of dioxins contained in the liquid was conducted by the process of FIG.2 which shows schematic diagram of the present invention.

A reactor 13 used for the wet-oxidation had the shape of cylinder (a diameter of 25 mm and a length of 2500 mm). The reactor 13 was filled with 1 liter of solid catalyst (pellet) containing composite oxide of titan and iron, and platinum, and the content of the platinum (Pt) was 0.3 weight percent with respect to the total amount of the solid catalyst. Liquid to be used in Example 1 was from waste incinerator. The liquid had TEQ (toxic equivalent) of 1.0 ng/liter and the dioxins concentration of 120 ng/liter.

The above-described liquid supplied through a conduit 6 and was pressurized by a pump 7 to flow at a flow rate of 1 liter/hr, and was heated to 165° C. by a heat exchanger 11 and a heater 12. Then, the liquid was supplied to the reactor 13 from its bottom side. On the other hand, air, which was pressurized by a compressor 9, was introduced to the liquid through a conduit 8. Noted that the flow rate of the air was controlled by an oxygen-containing gas flow rate control valve (not shown) so that the flow rate of the air keeps 30N liter/hr.

In the reactor 13, the liquid and the air were made to flow in an upward direction.

In the reactor 13, the temperature of the fluid (air added liquid) was kept at about 165° C. by an electric heater (not shown), and decomposition of dioxins was conducted. After the wet-oxidation, the wet-oxidized fluid (effluent fluid) was extracted and supplied through a conduit 14 to heat exchanger 11 and then to cooler 15 for cooling down the temperature of the effluent fluid. And the effluent fluid was supplied to gas-liquid separator 16 where the separation of the gas contained in the effluent fluid was conducted. In the gas-liquid separator 16, the liquid level was detected by a liquid level controller (LC), and the treated liquid was discharged from a liquid level control valve 18 in order to maintain the liquid level within predetermined liquid level range.

The pressure was detected by a pressure controller (PC), and was kept to 0.9 MPa(Gauge) by a pressure control valve 22. The liquid from which the gas was separated was discharged through the conduit 17.

The treated liquid obtained from the above wet-oxidation process had TEQ of 0.009 ng/liter, and dioxins concentration of 0.8 ng/liter.

EXAMPLE 2 to 17

The decomposition of dioxins contained in the liquid was conducted under the same condition with example 1 except that the catalyst used in example 1 was changed with the following catalyst.

Example 2: solid catalyst (pellet) containing composite oxide of titania and iron, and manganese as main components, and the content of the $MnO_2$ was 5 weight percent with respect to the total amount of the catalyst.

Example 3: solid catalyst (pellet) containing composite oxide of titania and iron, and cobalt as main components, and the content of the CoO was 5 weight percent with respect to the total amount of the catalyst.

Example 4: solid catalyst (pellet) containing composite oxide of titania and iron, and nikel as main components, and the content of the NiO was 5 weight percent with respect to the total amount of the catalyst.

Example 5: solid catalyst (pellet) containing composite oxide of titania and iron, and cerium as main components, and the content of the $CeO_2$ was 5 weight percent with respect to the total amount of the catalyst.

Example 6: solid catalyst (pellet) containing composite oxide of titania and iron, and tungsten as main components, and the content of the $WO_3$ was 5 weight percent with respect to the total amount of the catalyst.

Example 7: solid catalyst (pellet) containing composite oxide of titania and iron, and copper as main components, and the content of the CuO was 5 weight percent with respect to the total amount of the catalyst.

Example 8: solid catalyst (pellet) containing composite oxide of titania and iron, and silver as main components, and the content of the Ag was 0.3 weight percent with respect to the total amount of the catalyst.

Example 9: solid catalyst (pellet) containing composite oxide of titania and iron, and gold as main components, and the content of the Au was 0.3 weight percent with respect to the total amount of the catalyst.

Example 10: solid catalyst (pellet) containing composite oxide of titania and iron, and palladium as main components, and the content of the Pd was 0.3 weight percent with respect to the total amount of the catalyst.

Example 11: solid catalyst (pellet) containing composite oxide of titania and iron, and rhodium as main components, and the content of the Rh was 0.3 weight percent with respect to the total amount of the catalyst.

Example 12: solid catalyst (pellet) containing composite oxide of titania and iron, and ruthenium as main components, and the content of the Ru was 0.3 weight percent with respect to the total amount of the catalyst.

Example 13: solid catalyst (pellet) containing composite oxide of titania and iron, and iridium as main components, and the content of the Ir was 0.3 weight percent with respect to the total amount of the catalyst.

Example 14: solid catalyst (pellet) containing oxide of titan, and platinum, and the content of the platinum (Pt) was 0.3 weight percent with respect to the total amount of the catalyst.

Example 15: solid catalyst (pellet) containing oxide of titan and zirconium, and platinum, and the content of the platinum (Pt) was 0.3 weight percent with respect to the total amount of the catalyst.

Example 16: solid-catalyst (pellet) containing oxide of titan and silicon, and platinum, and the content of the platinum (Pt) was 0.3 weight percent with respect to the total amount of the catalyst.

Example 17: solid catalyst (pellet) containing oxide of aluminum and silicon, and platinum, and the content of the platinum (Pt) was 0.3 weight percent with respect to the total amount of the catalyst.

EXAMPLE 18

The decomposition of dioxins contained in the liquid was conducted under the same condition with example 1 except that the catalyst used in example 1 was changed with the activated carbon and platinum, and the content of the platinum (Pt) was 0.3 weight percent with respect to the total amount of the catalyst and the temperature of the liquid in the reactor 13 was kept at 95° C., and The pressure was detected by a pressure controller (PC), and was kept at atmospheric pressure by opening a pressure control valve 22.

COMPARATIVE EXAMPLE 1

The decomposition of dioxins contained in the liquid was conducted under the same condition with example 1 except that no catalyst was charged in the reactor 13.

The result of the example 1 to 18 and comparative example 1 was shown in table 1.

TABLE 1

|  | Catalyst | Dioxins concentration in the liquid [ng/liter] | TEQ (toxic Equivalent) of the liquid [ng/liter] |
| --- | --- | --- | --- |
| Example 1 | Pt—Ti/Fe | 0.8 | 0.009 |
| Example 2 | Mn—Ti/Fe | 1.9 | 0.03 |
| Example 3 | Co—Ti/Fe | 2.4 | 0.04 |
| Example 4 | Ni—Ti/Fe | 2.3 | 0.04 |
| Example 5 | Ce—Ti/Fe | 2.7 | 0.05 |
| Example 6 | W—Ti/Fe | 3.1 | 0.06 |
| Example 7 | Cu—Ti/Fe | 2.2 | 0.03 |

TABLE 1-continued

| | Catalyst | Dioxins concentration in the liquid [ng/liter] | TEQ (toxic Equivalent) of the liquid [ng/liter] |
|---|---|---|---|
| Example 8 | Ag—Ti/Fe | 2.0 | 0.03 |
| Example 9 | Au—Ti/Fe | 1.8 | 0.03 |
| Example 10 | Pd—Ti/Fe | 1.1 | 0.02 |
| Example 11 | Rh—Ti/Fe | 1.3 | 0.02 |
| Example 12 | Ru—Ti/Fe | 1.3 | 0.02 |
| Example 13 | Ir—Ti/Fe | 1.2 | 0.02 |
| Example 14 | Pt—Ti | 0.8 | 0.01 |
| Example 15 | Pt—Ti/Zr | 0.9 | 0.01 |
| Example 16 | Pt—Ti/Si | 0.9 | 0.01 |
| Example 17 | Pt—Al/Si | 1.2 | 0.02 |
| Example 18 | Pt-activated carbon | 1.0 | 0.02 |
| Comparative example 1 | Non | 110 | 0.9 |

EXAMPLE 19

The decomposition of dioxins contained in the soil was conducted by the process of FIG. 1 which shows schematic diagram of the present invention.

The soil to be used in this example is the soil obtained from the site wherein waste incinerator was used and burned ash of waste incinerator was added to the soil the concentration of dioxins in the soil was 810 ng/g (5.2 ng-TEQ/g). The soil was supplied to the float separation unit 2 thorough the conduit 1 at a rate of 0.03 kg/hr with stirred. Saturated amount of pressurized (0.3 MPa(Gauge)) air was dissolved into water and the water was supplied to the separation unit 2 through line 1a at a rate of 3 liter/hr. The soil, from which dioxins and dioxin containing content were separated, was extracted from the conduit 3. The concentration of dioxins in the soil, which is extracted from the conduit 3, was 72 ng/g (460 pg-TEQ/g) the liquid containing dioxins was extracted from the conduit 4 and the liquid was sent to the tank 5. The concentration of dioxins in the liquid was 7400 ng/liter(69 ng-TEQ/liter). The liquid in the tank 5 was supplied to the pump 7 thorough a conduit 6. The liquid was pressurized to 3 liter/hr by the pump 7. Air was pressurized (100N liter/hr) by compressor 9 and added to the liquid via the conduit 8. After the air was added to the liquid, then obtained liquid (fluid) was heated by the heat exchanger 11 and by heater 12 and was supplied to the reactor 13 from its bottom side.

A wet-oxidation reactor 13 used for the wet-oxidation had the shape of cylinder with a diameter of 25 mm and a length of 2500 mm. The reactor 13 was filled with 1 liters of solid catalyst (pellet) containing titania and platinum as main components, and the content of the platinum was 0.3 weight percent with respect to the total amount of the catalyst.

Noted that the flow rate of the air was controlled by an oxygen-containing gas flow rate control valve (not shown) 10 so that the flow rate of the air was kept 100N liter/hr.

In the reactor 13, the liquid and the air were made to flow in an upward direction.

In the reactor 13, the temperature of the fluid was kept at about 165° C. by an electric heater (not shown), and decomposition of dioxins was conducted. After the wet-oxidation, the wet-oxidized fluid (effluent fluid) was extracted and supplied through a conduit 14 to heat exchanger 11 and then to cooler 15 for cooling down the temperature of the effluent fluid. And the effluent fluid was supplied to gas-liquid separator 16 where the separation of the gas contained in the effluent fluid was conducted. In the gas-liquid separator 16, the liquid level was detected by a liquid level controller (LC), and the treated liquid was discharged from a liquid level control valve 18 in order to maintain the liquid level within predetermined liquid level range. The pressure was detected by a pressure controller (PC), and was kept to 0.9 MPa(Gauge) by a pressure control valve 22. The liquid from which the gas was separated was discharged through the conduit 17.

The treated liquid obtained from the above wet-oxidation process had TEQ of 0.7 ng/liter, and dioxins concentration of 91 pg/liter.

EXAMPLE 20

The wet-oxidation process was operated for decomposing the dioxins contained in the liquid about 100 hours continuously by using the unit in FIG. 2. And the cleaning of the wet-oxidation unit was conducted for 6 hours continuously. Following description is the procedure operated for cleaning the wet-oxidation reactor 13 and the result of the cleaning operation.

The reactor 13 was filled with 1 liter of solid catalyst containing titania oxide and iron oxide as a main components and the content of the platinum was 0.3 weight percent. Liquid used in Example 3 as dioxins containing liquid was spent liquid used for washing exhaust flue of waste incinerator. The liquid was containing dioxins and 160 mg/liter of calcium. The liquid had TEQ of 0.9 ng/liter and the dioxins concentration of 110 ng/liter.

The above-described liquid was supplied through the conduit 6 and was pressurized by the pump 7 to flow at a flow rate of 1 liter/hr, and was heated to 165° C. by a heat exchanger 11 and a heater 12. Then, the liquid was supplied to the reactor 13 from its bottom side. On the other hand, air ,which was pressurized by the compressor 9, was introduced to the liquid through the conduit 8. Noted that the flow rate of the air was controlled by an oxygen-containing gas flow rate control valve 10 so that the flow rate of the air was 30N liter/hr.

In the reactor 13, the liquid and the air were made to flow in an upward direction.

In the reactor 13, the temperature of the fluid (air added liquid)was kept at about 165° C. by an electric heater (not shown), and decomposition of dioxins was conducted. After the wet-oxidation, the wet-oxidized fluid (effluent fluid) was extracted and supplied through the conduit 14 to the heat exchanger 11 and then to cooler 15 for cooling down the temperature of the fluid. And the effluent fluid was supplied to gas-liquid separator 16 where the separation of the gas contained in the effluent fluid was conducted. In the gas-liquid separator 16, the liquid level was detected by a liquid level controller (LC), and the treated liquid was discharged from a liquid level control valve 18 in order to maintain the liquid level within predetermined liquid level range. The pressure was detected by a pressure controller (PC), and was kept to 0.9 MPa(Gauge) by a pressure control valve 22. The liquid from which the gas was separated was discharged through the conduit 17.

After the wet-oxidation process was ceased, the cleaning of the unit used for the wet-oxidation process was conducted. Noted that solid matter was attached on the surface of the catalyst charged in the wet-oxidation reactor 13. By the analysis of the electron prove microanalizer, the solid matter was comprised of calcium as a main component.

Alkali cleaning solution containing 100 g/liter of sodium hydroxide was supplied through the conduit 6 and was pressurized by the pump 7 to flow at a flow rate of 0.5 liter/hr, and was heated to 165° C. by the heat exchanger 11 and the heater 12. Then, the alkali cleaning solution was supplied to the reactor 13 from its bottom side. On the other hand, air, which was pressurized by the compressor 9, was introduced to the alkali cleaning solution through the conduit 8. Noted that the flow rate of the air was controlled by an oxygen-containing gas flow rate control valve 10 so that the flow rate of the air was 0.05 $Nm^3$/hr. In the reactor 13, the alkali cleaning solution and the air were made to flow in an upward direction.

In the reactor 13, the temperature of the alkali cleaning solution was kept at about 165° C. by an electric heater (not shown), and treatment of the solid matter was conducted. After the cleaning operation, the spent alkali cleaning solution was extracted and supplied through the conduit 14 to heat exchanger 11 and then to cooler 15 for cooling down the spent alkali cleaning solution. And then the alkali cleaning solution was supplied to gas liquid separator 16 where the separation of the gas contained in the alkali cleaning solution was conducted. In the gas-liquid separator 16, the alkali cleaning solution level was detected by a liquid level controller (LC), and the alkali cleaning solution was discharged from a liquid level control valve 18 in the state where solution level was kept to be within the predetermined range. The pressure inside the reactor 13 was detected by a pressure controller (PC), and was kept to 0.9 MPa(Gauge) by a pressure control valve. The liquid from which the gas was separated from the alkali cleaning solution was discharged through the liquid discharge line 17.

As a result of the cleaning, almost all of the solid matter attached on the surface of the catalyst was removed.

After cleaning operation, the decomposition of dioxins used in example 20 was conducted by using the same process mentioned above, and said cleaning operation was conducted each time after the decomposition operation (total 2 times).

As a result of the cleaning, no solid matter was attached on the surface of the catalyst and the operation of decomposing dioxins was conducted without clogging the wet-oxidation reactor 13.

EXAMPLE 21

The decomposition of dioxins and the cleaning of the unit used thereof were conducted under the same condition with example 20 except that the spent liquid used for washing exhaust flue of waste incinerator was used as the dioxin containing liquid and 1 liter of catalyst containing titania—zirconium composite oxide as a main components and the content of the platinum was 0.3 weight percent with respect to the total amount of the catalyst.

The liquid was containing dioxins and 110 mg/liter of Aluminum was used. The liquid had TEQ of 0.9 ng/liter and the dioxins concentration of 110 ng/liter.

After decomposing dioxins, large quantity of the solid matter was attached on the surface of the catalyst. By the analysis of the electron prove microanalizer, the solid matter was comprised of aluminum as a main component. After the cleaning operation, the solid matter attached on the surface of the catalyst was removed.

EXAMPLE 22

The decomposition of dioxins and the cleaning of the unit used thereof were conducted under the same condition with example 20 except that no air was supplied to the alkali cleaning solution, the concentration of sodium hydroxide in the alkali cleaning solution was kept 20 g/liter during the cleaning operation, and the cleaning operation time was 40 hour. After the cleaning operation, almost all of the solid matter attached on the surface of the catalyst was removed.

EXAMPLE 23

The decomposition of dioxins and the cleaning of the unit used thereof were conducted under the same condition with example 20 except that acid cleaning solution including 100 g/liter of hydrochloric acid and 600 mg/liter of iron ion was used instead of the alkali cleaning solution, and the temperature of the acid cleaning solution was kept at 90° C. during the operation, and the cleaning operation was conducted under atmospheric pressure.

After the cleaning operation, almost all of the solid matter attached on the surface of the catalyst was removed.

After decomposing dioxins, large quantity of the solid matter was attached on the surface of the catalyst. By the analysis of the electron prove microanalizer, the solid matter was comprised of calcium as a main component.

After the cleaning operation, the solid matter attached on the surface of the catalyst was removed.

EXAMPLE 24

The decomposition of dioxins and the cleaning of the unit used thereof were conducted under the same condition with example 23 except that the acid cleaning solution including 200 g/liter of sulfuric acid and 0.8 g/liter of copper ion was used.

After the cleaning operation, almost all of the solid matter attached on the surface of the catalyst was removed.

After decomposing dioxins, large quantity of the solid matter was attached on the surface of the catalyst. By the analysis of the electron prove microanalizer, the solid matter was comprised of calcium as a main component.

After the cleaning operation, the solid matter attached on the surface of the catalyst was removed.

EXAMPLE 25

The decomposition of dioxins and the cleaning of the unit used thereof were conducted under the same condition with example 23 except that no oxidizing agent was supplied to the acid cleaning solution.

After the cleaning operation, almost all of the solid matter attached on the surface of the catalyst was removed.

After decomposing dioxins, large quantity of the solid matter was attached on the surface of the catalyst. By the analysis of the electron prove microanalizer, the solid matter was comprised of calcium as a main component.

After the cleaning operation, the solid matter attached on the surface of the catalyst was almost removed.

COMPARATIVE EXAMPLE 2

The decomposition of dioxins was conducted under the same condition with example 20 except that no cleaning operation was conducted.

After 300 hours of the decomposition of dioxins, the wet-oxidation reactor 13 was ceased due to clogging inside the wet-oxidation reactor 13. The clogging was caused by solid matter which is attached on the surface of the catalyst and to inside wall of the reactor 13. By the analysis of the electron prove microanalizer, the solid matter was comprised of calcium as a main component.

What is claimed is:

1. A method for decomposing or oxidizing dioxins and/or PCBs in waste water comprising:

introducing said waste water and an oxygen-containing gas into a reactor containing a solid catalyst;

contacting said waste water and oxygen-containing gas with said solid catalyst; and applying pressure to said reactor to keep said waste water in liquid phase.

2. A method according to claim 1, wherein said dioxins and/or PCBs are decomposed or oxidized in said reactor at a liquid temperature range from 20° C. to 370° C.

3. A method according to claim 1, wherein said catalyst is at least one member selected from the group consisting of a metal or a compound of titanium, silicon, aluminum, zirconium, manganese, iron, cobalt, nickel, cerium, tungsten, copper, silver, gold, platinum, palladium, rhodium, ruthenium and iridium, or the catalyst is activated carbon.

4. A method according to claim 1, wherein said catalyst comprises 'A' component and 'B' component:

Said 'A' component is (1) oxide of at least one element selected from the group consisting of titanium, silicon, aluminum, and zirconium, (2) activated carbon or (3) said oxide and activated carbon; and Said 'B' component is at least one member selected from the group consisting of a metal or a compound of manganese, iron, cobalt, nickel, cerium, tungsten, copper, silver, gold, platinum, palladium, rhodium, ruthenium and iridium.

5. A method for decomposing or oxidizing dioxins and/or PCBs in a second liquid obtained by contacting soil and/or ash containing dioxins and/or PCBs with a first liquid for extraction, comprising:

introducing said second liquid and an oxygen-containing gas into a reactor containing a solid catalyst;

contacting said second liquid and oxygen-containing gas with said solid catalyst; and applying pressure to said reactor to keep said second liquid in liquid phase.

6. A method according to claim 5, wherein said soil and/or said ash is introduced to said first liquid for extraction and separating said dioxins from said soil and/or said ash.

* * * * *